(12) United States Patent
McKiel

(10) Patent No.: US 8,594,980 B2
(45) Date of Patent: Nov. 26, 2013

(54) METHOD AND APPARATUS OF TEMPLATE MODEL VIEW GENERATION FOR HOME MONITORING AND CONTROL

(75) Inventor: Frank A. McKiel, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 555 days.

(21) Appl. No.: 12/562,448

(22) Filed: Sep. 18, 2009

(65) Prior Publication Data

US 2011/0071656 A1    Mar. 24, 2011

(51) Int. Cl.
*G06F 17/50* (2006.01)
*G09G 5/00* (2006.01)

(52) U.S. Cl.
USPC ............... 703/1; 345/621; 345/653; 345/665; 345/680

(58) Field of Classification Search
USPC ................. 703/1; 345/621, 653, 665, 680
See application file for complete search history.

(56) References Cited

U.S. PATENT DOCUMENTS

| | | | |
|---|---|---|---|
| 2003/0233432 A1* | 12/2003 | Davis et al. | 709/222 |
| 2004/0267401 A1* | 12/2004 | Harrison | 700/182 |
| 2005/0288955 A1* | 12/2005 | Lewiss-Hachmeister | 705/1 |
| 2007/0096902 A1* | 5/2007 | Seeley et al. | 340/539.18 |
| 2007/0248249 A1* | 10/2007 | Stoianov | 382/124 |
| 2008/0126022 A1* | 5/2008 | Hoguet | 703/1 |
| 2009/0057425 A1* | 3/2009 | Sullivan et al. | 236/51 |

OTHER PUBLICATIONS

"Automated Recognition of Architectural Drawings", Koutamanis et al. 1992 IEEE.*

* cited by examiner

*Primary Examiner* — Omar Fernandez Rivas
*Assistant Examiner* — Nithya J Moll

(57) ABSTRACT

An approach is provided for template model view generation for home monitor and control interface. A platform receives a model view specified by a user, where the model view includes a floor plan of a premise. The platform generates a template model view based on the received model view by removing identifying information associated with the user. Also, the platform stores the template model view for access by another user, where the template model view is used to capture location information of one or more sensors or one or more actuators within the floor plan.

18 Claims, 11 Drawing Sheets

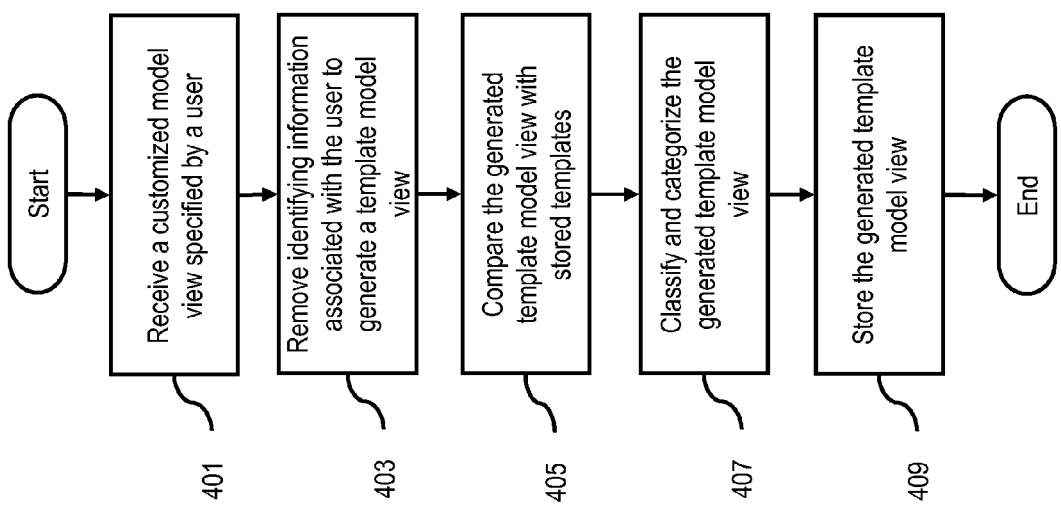

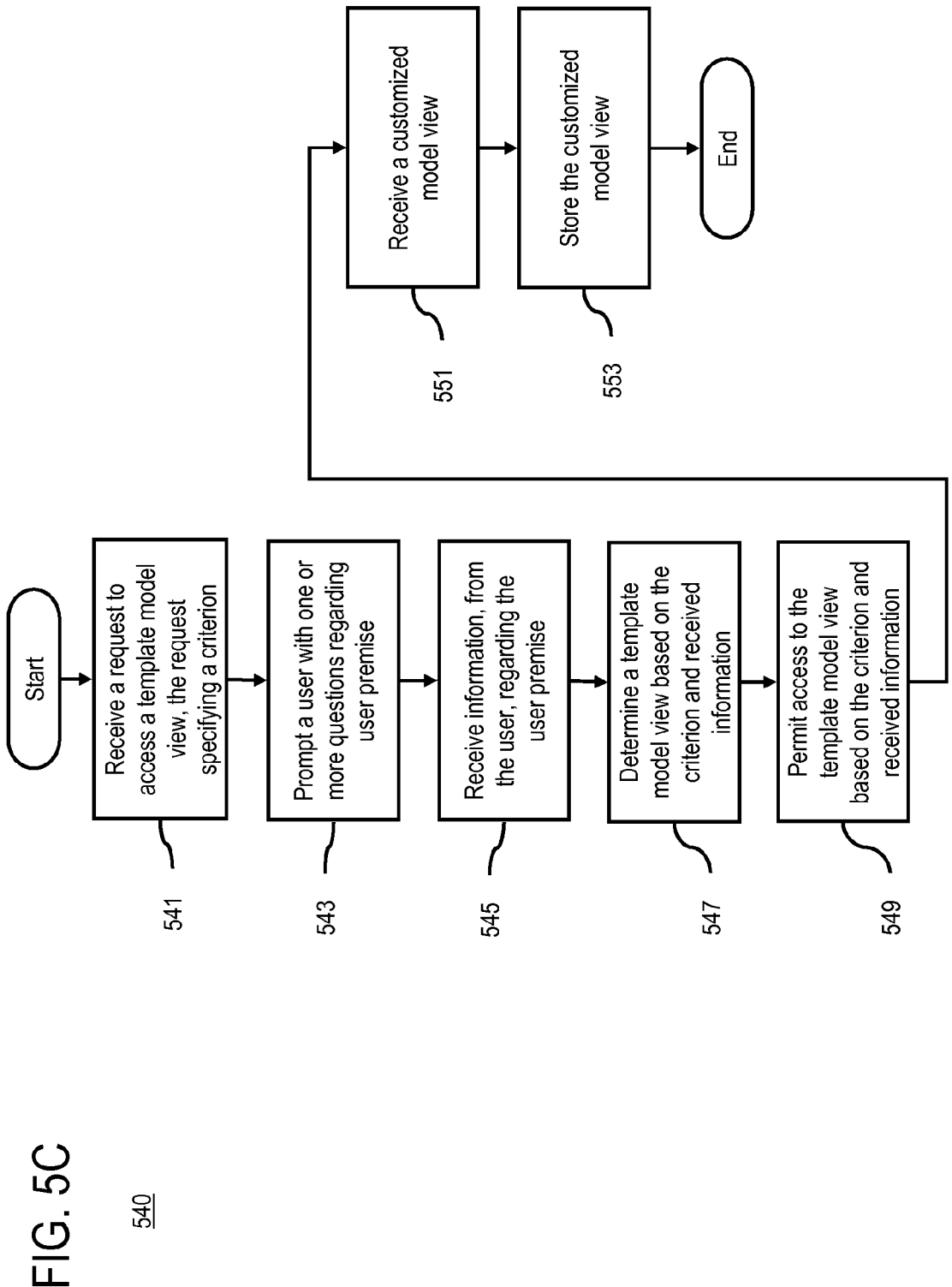

METHOD AND APPARATUS OF TEMPLATE MODEL VIEW GENERATION FOR HOME MONITORING AND CONTROL

BACKGROUND INFORMATION

Convenience and security have fueled the growth of home monitoring and control systems. However, the development of user interfaces have lacked in sophistication and the capability for customization. Namely, such interfaces are overly simplistic with respect to how information, e.g., location of sensors, lighting fixtures, etc., are presented to the home owner; in fact, many interfaces are text based. Moreover, designers of the user interfaces for these systems have largely ignored that fact that home designs and layout can vary greatly, thereby providing little or no flexibility in providing an accurate visual representation of the home and the location of sensors and controllable elements therein. If even possible, customization of the user interfaces is cost prohibitive under conventional approaches.

Therefore, there is a need for an approach for improved model view creation and template model view generation for a home monitor and control interface.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 4 is a flowchart of a process for generating a template model view, according to an exemplary embodiment;

FIGS. 5A-5D are flowcharts of processes for initiating a home monitor and control interface and for accessing template model views, according to various exemplary embodiment;

DESCRIPTION OF THE PREFERRED EMBODIMENT

A preferred apparatus, method, and system for template model view generation for home monitor and control interface are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1:
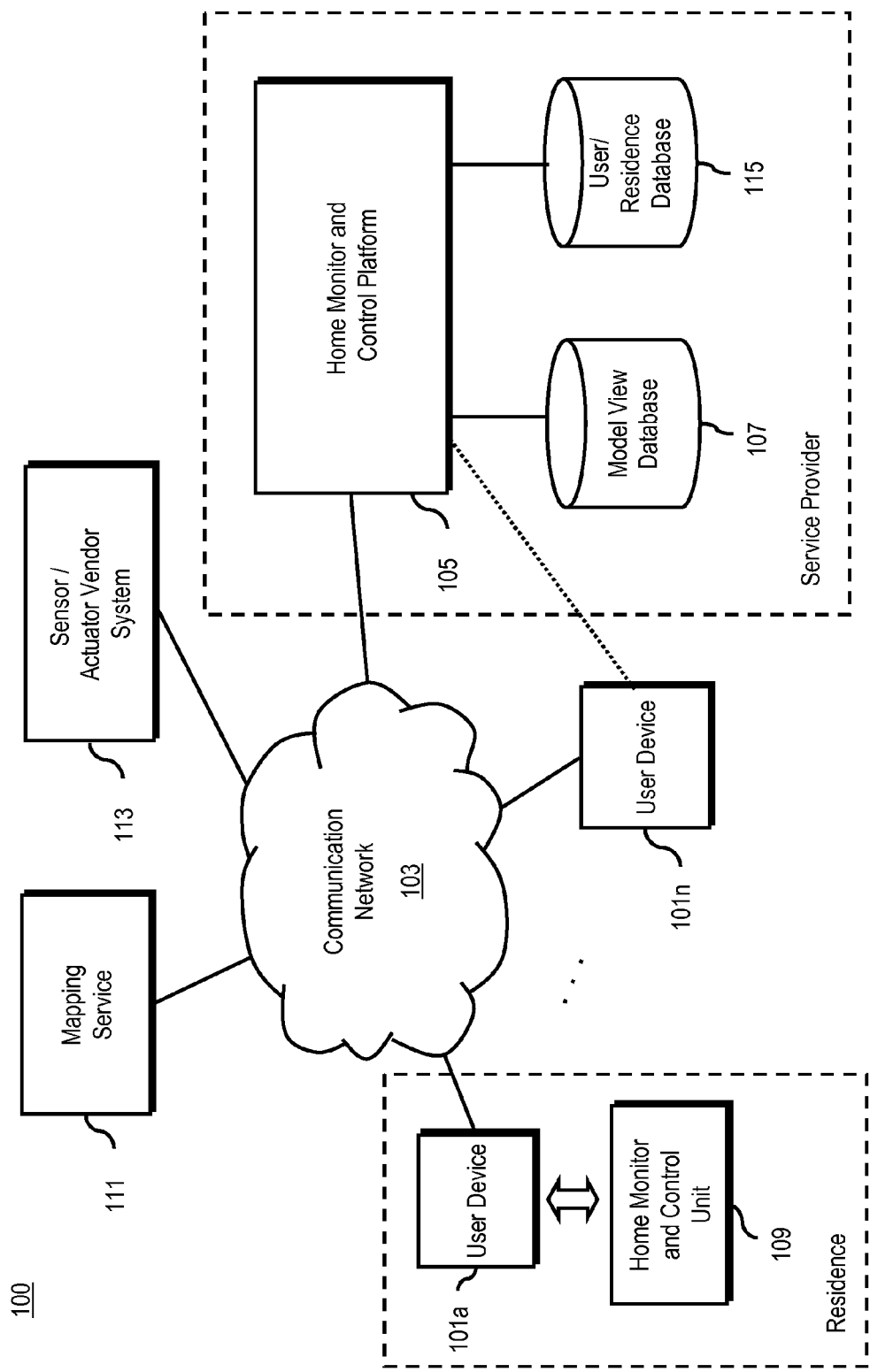
FIG. 1 is a diagram of a system capable of template model view generation for home monitor and control, according to an exemplary embodiment.

FIG. 1 is a diagram of a system capable of template model view generation for home monitor and control, according to an exemplary embodiment. As shown, system 100 includes one or more user devices 101*a*-101*n* that can communicate over a communication network 103 with a home monitor and control platform 105. The platform 105 can support a variety of services, e.g., security or remote control of household systems (e.g., lighting and appliances). As an example, for remote control of household lighting and appliances, a host of equipment, such as television displays, personal computers, and mobile devices, can support user interfaces for control and monitoring. In this context, according to certain embodiments, the platform 105 provides the capability to present a user interface in the form of a "model view," such as a floor plan, elevation or transparent 3-dimensional (3-D) rendering, along with visual indicators corresponding to the locations of actual sensors and actuators within a premise (e.g., home, dwelling, building, etc.). Also, the state of these sensors and actuators may be represented by the appearance of the iconic representations or other visual cues in the user interface.

For the purpose of illustration, home monitor and control platform 105 provides a model view creation capability that permit users to conveniently design a customized floor plan or home layout for use in a user interface of a monitor and control unit. According to one exemplary embodiment, the capabilities and functions of the home monitor and control platform 105 is provided as managed service by a service provider.

According to another exemplary embodiment, home monitor and control platform 105 can generate template model views based on model views specified by users and can store the template model views in, for example, model view database 107. The template model views are model views that can serve as templates for all users, whereby these templates are devoid of any user identifying information. Such templates substantially simplify the process for a new user in generating a customized model view to suit their particular needs. This in turn promotes large scale uptake of home control products and services by both the service provider and sensor/actuator vendors shown in FIG. 1. The platform 105 can receive a model view that has been customized and specified by a user based on the user's premise. In addition to model views derived from users (or subscribers), the model views can also be obtained from third parties, for instance. Home monitor and control platform 105 can utilize the received model view to generate a template model view by "anonymizing" the model views associated with particular users or subscribers. In other words, the model view database 107 is populated with floor plans and layouts of homes without any user identification or identification of a particular residence. Thus, when home monitor and control platform 105 receives the model view specified by the user, the platform 105 is configured to remove or disassociate any information associated with the user or the user's specific premise. This information can include specific information regarding sensors and/or actuators locations. For example, home monitor and control platform 105 can remove any specific information associated with the user's premise such as dimensions, specific labels (e.g., master bedroom, guest room, etc.) of rooms, etc. Further, home monitor and control platform 105, can store the model view specified by the user as an anonymized template model view, after identifying information is purged. Before storing the template model view, home monitor and control platform 105 can compare the generated template model views with stored templates and can categorize the generated template model view. The templates within the model view database 107 can then be used as baseline templates for other users to customize views for their particular residences.

Communication network 103 may include one or more networks such as a data network and/or a telephony network. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. Moreover, communication network 103, if in the form of a telephony network, can be provided via a combination of circuit-switched technologies or a packetized voice infrastructure.

For the purpose of illustration, communication network 103 can include a radio network that supports a number of wireless terminals, which may be fixed or mobile, using various radio access technologies. According to one exemplary embodiment, radio technologies that can be contemplated include: first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), 4G, etc. For instance, various mobile communication standards have been introduced, such as first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), and beyond 3G technologies (e.g., third generation partnership project (3GPP) long term evolution (3GPP LTE), 3GPP2 universal mobile broadband (3GPP2 UMB), etc.).

Complementing the evolution in mobile communication standards adoption, other radio access technologies have also been developed by various professional bodies, such as the Institute of Electrical and Electronic Engineers (IEEE), for the support of various applications, services, and deployment scenarios. For example, the IEEE 802.11 standard, also known as wireless fidelity (WiFi), has been introduced for wireless local area networking, while the IEEE 802.16 standard, also known as worldwide interoperability for microwave access (WiMAX), has been introduced for the provision of wireless communications on point-to-point links, as well as for full mobile access over longer distances. Other examples include Bluetooth, ultra-wideband (UWB), the IEEE 802.22 standard, etc.

Home monitor and control platform 105 can include or be connected to a model view database 107, which stores information corresponding to template model views, customized model views, and/or monitoring and controlling devices. According to certain embodiments, the templates are stored without any identifying information as to whose homes these templates were derived from, as to prevent security or privacy compromises. Based on the templates of the database 107, a user can create a floor plan using a template that closely resembles the user's home as a baseline, thereby expediting the design process and increasing the ease with which even novice end users can readily adapt the model to meet their needs. The platform 105 can also support the capability to illustrate sensors and actuators within this customized layout.

It is noted that the user can be the end user (i.e., home owner), an end user associated with device 101a, or an authorized representative of a service provider of this platform 105. This representative user can, for example, employ user device 101n (e.g., desktop computer), which can directly access the control platform 105 using the service provider's network (not shown), or communication network 103.

With respect to user device 101a, this device 101a can interface with a home monitor and control unit 109. The unit 109, according to certain embodiments, includes a display for presenting a graphical user interface (GUI) that can provide a 3-dimensional (3D) rendering of the created model view. The rendering can also be in the form of a plan or elevation view or even be readily switchable among these options under control of the user while using the platform. The view can include the location of sensors and actuators for monitoring and controlling various equipment throughout the dwelling. Practical examples of sensors and actuators include, but are not limited to, lighting appliances, room temperature sensors/controls, home entertainment system remote controls, solar panel controls, alarm/security systems, control of electrical outlets, sprinkler systems, utility consumption meters, window shades, ventilation controls, swimming pool heaters/pumps/lights, etc. By way of example, the communication with these devices is often implemented using X10, Ethernet, WiFi, ZigBee or other wireless or hardwired communication links, often employing existing wiring within the premise.

Alternatively, user device 101a can itself be configured to act as the home monitor and control unit 109 by presenting a GUI for home monitoring and control. A user can view the interface to monitor different sensors that are provided within the user's premise. Further, the user can use the graphical user interface to control different actuators provided in the premise.

As shown, the platform 105 can interact with a mapping service 111, and a sensor/actuator vendor system 113. The mapping service 111, in one embodiment, can be maintained by a third party (with respect to the service provider) for supplying information related to a user or subscriber's residence. For instance, the mapping service can provide information about the residence of the subscriber; such information can include images of the residence (e.g., design and elevation of the house), information (e.g., images) about neighboring homes, etc. The platform 105 can also communicate with the sensor/actuator vendor system 113 to obtain information about sensors and actuators that can be used to enhance the accuracy of the model view depicted on the home monitor and control unit 109, for example.

According to one embodiment, the platform 105 can utilize a user/residence database 115 for collecting and storing information about subscribers and their residences (dwellings). Such information can include, for example, whether the residence is part of a development, information about the developer, architectural plans for the development, etc. In this manner, the platform 105 can determine whether certain residences are a part of the same development. Generally, homes fabricated as part of a development will tend to have similar layouts and floor plans. Consequently, the platform 105 can suggest one or more templates to subscribers within a known development, thereby minimizing the customization required by the subscribers. Moreover, the user/residence database 115 can include information about particular services related to the deployment and installation of sensors and actuators within the subscribers' homes. As such, the platform 105 can leverage installation information about the sensors and actuators from the vendor system 113, by populating typical configuration scenarios for these sensors and actuators. Vendor system 113 may also provide pluggable software objects or graphical elements corresponding to the particular devices that are installed at a user premise to provide a branded look and feel for how the devices are to be represented in the customized model view. It is noted that the information stored within database 115, as with the model view database 107, is such that user identification information is removed (or anonymized), whereby only generalized information is stored.

According to one exemplary embodiment, the home monitor and control unit 109 presents, via a graphical user interface, a model view of the user's premise to provide location information related to the sensors and the actuators. In one example, the model view can include a floor plan, an elevation, or transparent 3-D rendering along with visual indicators corresponding to location of actual sensors and actuators in the user's premise. The actuators, for example, can be within household appliances, consumer electronics, lighting systems, sprinkler systems, HVAC equipment, etc.

In one embodiment, the state of each of sensors and actuators may be represented by appearance of iconic representations. Each iconic representation may also serve as a "hot spot" where the user may engage the home monitor and control unit 109 to control state of a remote device (such as sensors, actuators, etc.) or receive more extensive information about the device (such as sensors, actuators, etc.). For example, a light in entry way of a premise may be represented by a graphical element in an analogous position within the model view. An on/off state of the light may be illustrated by the graphical element having, for example, a light appearance or a dark appearance. Alternatively or additionally, home monitor and control unit 109 may render a 3-D model view with illumination from the light source may be actually be rendered to visibly show on walls and floor of the model view. According to one exemplary embodiment, the model view of the user's premise can be stored on the user device. The model view of the user's premise can be stored remotely (such as on model view database 107) and user device 101a can operatively be connected to home monitor and control platform 105 through communication network 103 to receive the model view associated with the premise of the user.

In an exemplary embodiment, home monitor and control platform 105 can store current and/or historical data for monitoring and/or controlling devices within the user/residence database 115. Moreover, current and/or historical data for monitoring and/or controlling devices can be stored in the user device 101a and/or the unit 109.

According to another exemplary embodiment, user device 101a can be used to receive a template model view from home monitor and control platform 105. This template is then modified by the user to create a customized model view for the specific requirements and details of the user's premise. In certain embodiments, the template is intelligently determined by the platform 105 based on information about the user and the user's home. Because the user need not start from "scratch," the design of the model view creation process is convenient and expedient, lending to large scale acceptance of the home monitoring and control service offered by the service provider.

In one example, the user can utilize user device 101a to request the template model view from home monitor and control platform 105. User device 101a can transmit information related to the premise of the user, along with other useful information (e.g., security services the user is utilizing, etc.) so that the platform 105 can select an appropriate baseline template model. This information can include, for example, style of the premise (e.g., ranch, cape, townhouse, etc.), number of floors in the premise, number of rooms, number of bathrooms, architectural description, geographical location of the premise, information related to a developer of the premise, etc.

Alternatively or additionally, home monitor and control platform 105 can prompt the user of user device 101a with a set of questions (e.g., a wizard type tool) to obtain necessary information regarding the user's residence to narrow the selection to a good starting template.

In another exemplary embodiment, home monitor and control platform 105 can interact with the mapping service 111, which can supply other information related to the premise of the user, as mentioned above. For example, the mapping service 111 can provide an image of the particular home as well as neighboring homes (or the entire development).

Upon receiving the user's request for a template model view, the home monitor and control platform 105 can perform an appropriate search of the model view database 107 for a template model view that best corresponds to the received information regarding the user's premise. The platform 105 can leverage the fact that residential neighborhoods and developments typically repeat floor plans with slight variations or in mirror image. Thus, the user/residence database 115 can store publicly available records about developments, and builders, to permit correlation of the user premise with one of the developments and/or builders. This correlation can significantly narrow the search for an appropriate template.

When the best template model view for the user's premise is found, home monitor and control platform 105 transmits the template model view to the user device 101a. At this point, the user can customize the received template model view using a graphical user interface (such as a model view creation interface) presented at user device 101a to tailor the template model view. For example, the user can adjust the dimensions, add/remove walls, place windows, and/or other features, etc. Moreover, the user can add specific control and monitor devices to the customized model view. In one exemplary embodiment, the model view creation graphical user interface can provide standardized and pluggable user interface elements for each monitoring/controlling device/brand to populate a palette of devices that the user can select from.

Alternatively or additionally, model view creation graphical user interface (resident on the user device 101a) can directly or indirectly (through the platform 105) communicate with the sensor/actuator vendor system 113 to provide pluggable user interface elements for each monitoring/controlling device/brand.

According to one embodiment, the newly created template can be transmitted to home monitor and control platform 105 for storage. The platform 105 will remove, using an anonymizing mechanism, identifying information relating to the user and the specific home for storage in the model view database 107. In this way, the newly created model view can be made into yet another template that can be used by another subscriber.

After the customized model view is completed, the user device 101a can export it into the home monitor and control unit 109. Alternatively, the user device 101a itself can serve as the home monitor and control interface to monitor sensors and control actuators in the user's premise.

To improve efficiency of generating template model views and creating customized model view as well as to promote adoption of this service by the user, the system 100 utilizes a template generation scheme that is more fully described below with respect to FIGS. 2-6.

Figure 2:
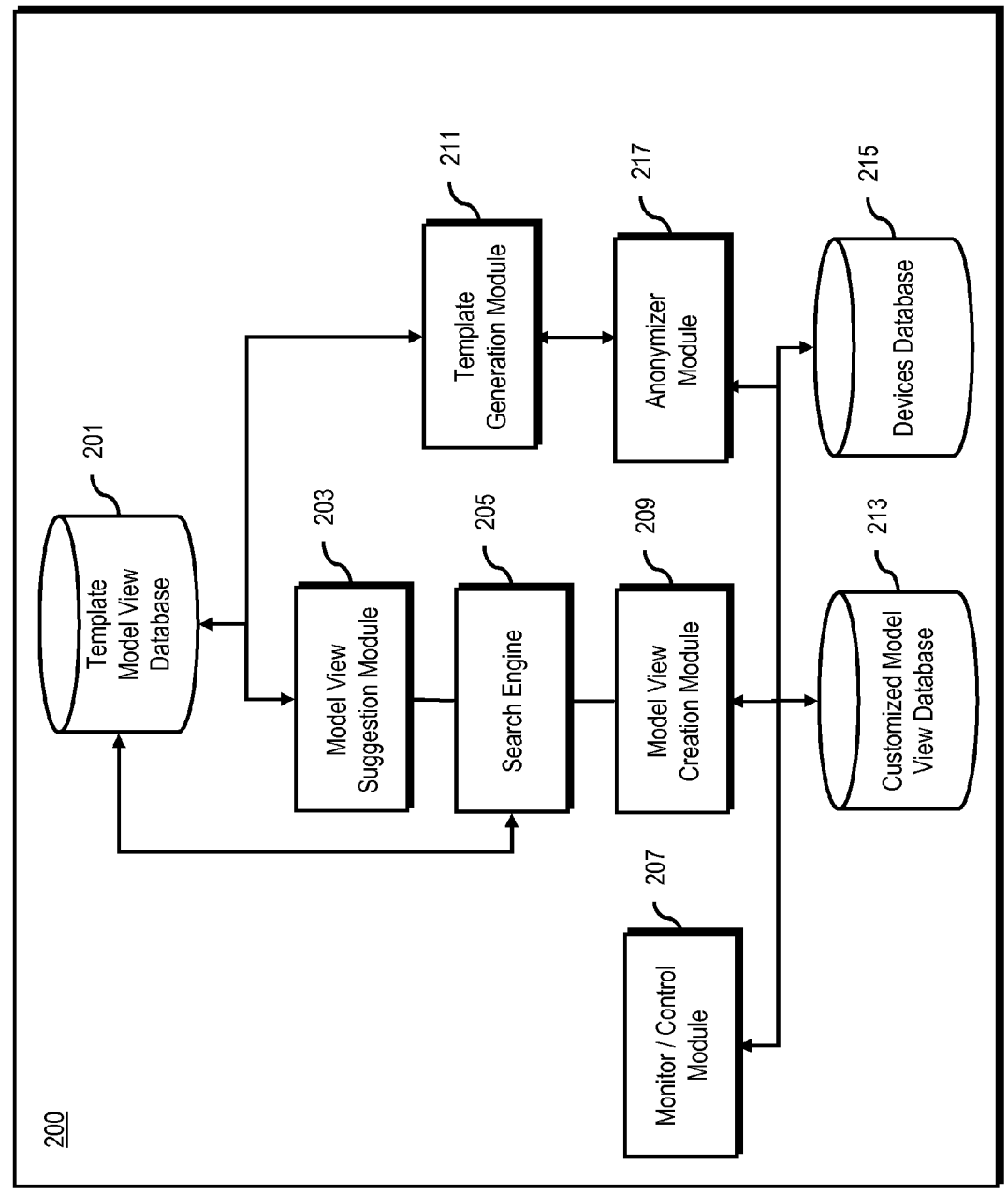
FIG. 2 is a diagram of components of home monitor and control platform of FIG. 1, according to an exemplary embodiment.

FIG. 2 is a diagram of components of home monitor and control platform 105 of FIG. 1, according to an exemplary embodiment. For the purpose of illustration, home monitor and control platform 200 (e.g., platform 105 of system 100) can include various components: a template model view database 201, a model view suggestion module 203, a search engine 205, a model view creation module 209, a template generation module 211, a model view database 213, a devices database 215, and an anonymizer module 217. Effectively, these components support two major functions: creation of specific model views for users, and creation of generic, reusable templates. Alternatively, the platform 105 can also provide the actual monitoring and control functions for the premises, in addition to the interface design. Some of the components listed below can also be hosted in or through the home monitor and control unit 109.

When a user or subscriber logs on the platform 200 and initiates a model view creation process, the platform 200 invokes the model view creation module 209 and the model view suggestion module 203 to obtain information about the user and the user's premise. Under one scenario, model view creation module 209 receives a request from the user device 101a to create a model view. As mentioned earlier, in one example, the user transmits information related to the user's premise to help identify a starting template. In another example, model view creation module 209 prompts the user with a set of questions related to the user's premise.

Such information is employed by the suggestion module 203 to determine one or more suitable templates, which are found within the template model view database 201 using the search engine 205. In particular, search engine 205 can be used to search template model view database 201 based on information regarding the user's premise and to locate a template model view that best resembles the user's premise. Alternatively or additional, model view suggestion module 203 can collect information related to the user's premise from, for example, mapping service 111 of system 100. Based on the collected information, model view suggestion module 203 can suggest one or more template model views to the user.

Model view suggestion module 203 can then send a suggested template model view to the user based on information gathered by home monitor and control platform 105, for example, from mapping service 111 of system 100. Multiple suggestions can be forwarded to the user for selection of an appropriate one template if more than one template fits the profile of the user.

Once the template(s) is selected by the model view suggestion module 203, the platform 105 can send the template to the user device 101a. Thereafter, the user can customize the template model view and add specific monitoring and/or control devices to the customized model view, using a graphical user interface controlled by the model view creation module 209.

At this point, the model view creation module 209 can behave as a server process to lead the user through the creation process. Alternatively, the model view creation module 209 can initiate download of an application (e.g., client software) to be executed by the user device 101a, so that customization process is performed locally with respect to the user device 101a. Under the server-based scenario, the model view creation module 209 can present a graphical tool for the user to customize the template. For example, the user can select and drag graphical elements (e.g., icons) onto the floor plan, as well as alter the relative dimensions of the floor plan.

After completion of the customization process, the customized model view can be stored in database 213 (in the case of a managed services implementation). That is, customized model view can be stored in customized model view database 213 to be further accessed by the user through home monitor and control interface.

Monitor/control module 207 can be used to control and operate the graphical user interface of user device 101a or the unit 109. Monitor/control module 207 can operatively be connected to customized model view database 213 and devices database 215 to retrieve information stored therein as to provide needed information over the graphical user interface regarding sensors and/or actuators and the customized model view. The monitor/control module 207 can be used to provide assistance with monitoring different sensors in the user's premise and also to control different actuators based on sensor readings. As discussed, the home monitor and control graphical user interface can be displayed by the user device 101a or the unit 109 (i.e., located within the user's premise). Alternatively or additionally, such home monitor and control interface can be presented by another user device (not shown) that resides remotely from the user's premise. Accordingly, the user can continue to monitor and control the sensors and actuators when the user is away from the actual premise.

According to another exemplary embodiment, home monitor and control platform 105 can include a template generation module 211 that is configured to generate template model views from model views that are specified by users. As mentioned these templates are purged of user identification information via the anonymizer module 217.

Specifically, template generation module 211 can determine, from the customized model view, identifying information associated with the user and/or the particular user premise. Further, template generation module 211 operating in conjunction with the anonymizer module 217 removes or masks the determined identifying information from the customized model view to generate a template model view. In one exemplary embodiment, template model view can be compared to templates stored in template model view database 201 and can be categorized based on the comparison. Generated template model view can be stored in template model view database 201 such that it can be used by another user to create a customized model view.

Figure 3:
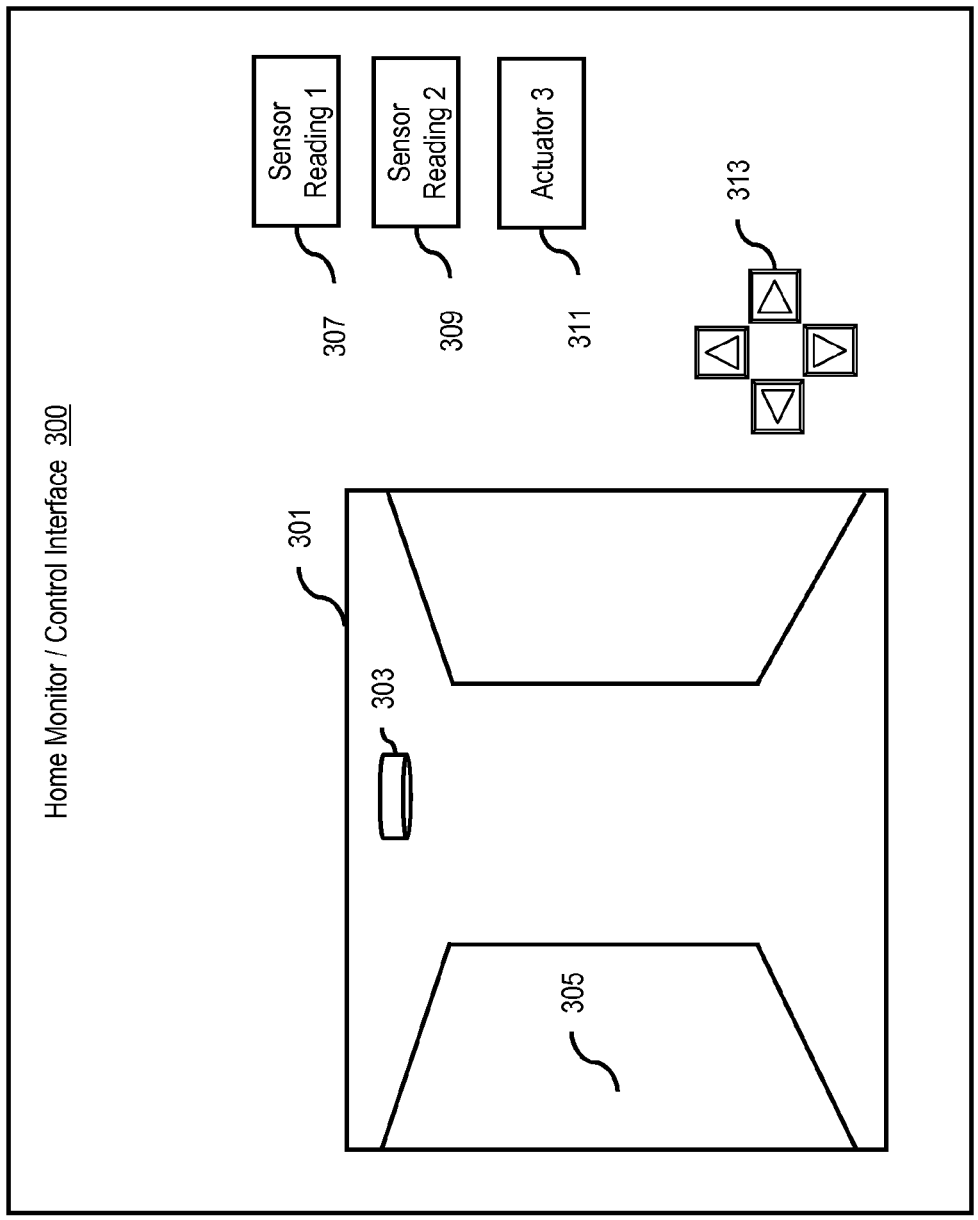
FIG. 3 is a diagram of a home monitor and control graphical user interface, according to an exemplary embodiment.

FIG. 3 is a diagram of a home monitor and control graphical user interface, according to an exemplary embodiment. For illustration purposes, home monitor and control interface 300 can include a customized model view 301. As discussed before, customized model view 301 can include, for example, floor plan, elevation, transparent 3-D rendering, etc. Customized model view 301 can provide visual indicators corresponding to locations of actual sensors and/or actuators in the user's premise. For example, customized model view 301 illustrates a graphical element 303 corresponding to a light in an analogous position in an entry way 305 of the user's premise. The on/off state of the light can be shown by the graphical element 303 having, for example, a light appearance or a dark appearance.

In example of FIG. 3, customized model view 301 of home monitor and control interface 300 represent only a part of the user's premise. In this example, home monitor and control interface 300 can include soft direction keys 313 in order to navigate through the customized model view 301 to view different parts of the user's premise. However, it is contemplated that different viewing alternatives as well as different pointer or cursor controls can be provided.

In this example, home monitor and control interface 300 illustrates sensor readings 307 and 309 to monitor different sensors that are provided in the user's premise. Also, home monitor and control interface 300 can include an actuator 311 that is coupled to an equipment for monitoring and control.

FIG. 4 is a flowchart of a process for generating a template model view, according to an exemplary embodiment. In one embodiment, process 400 can be performed at template generation module 211 of FIG. 2. In step 401, template generation module 211 receives a customized model view specified by a user. The received customized model view corresponds to a user's premise and can include a floor plan of the user's premise. The received customized model view can include identifying information associated with the user. In step 403, process 400 removes the identifying information associated with the user in order to generate a generalized (or anonymized) template model view. In one exemplary embodiment, step 403 can first determine the identifying information associated with the user before removing the information. Removing identifying information associated with the user can ensure privacy and security for the service. As mentioned before, identifying information can include, for example, specific information as to sensors and actuator locations. Further explanation as to the removal of identifying information is provided further below in conjunction with FIG. 8.

At step 405, process 400 compares the generated template model view with stored templates (stored in, for example, template model view database 201 of FIG. 2). At step 407, the generated template model view can be classified and categorized based on the comparison result of step 405. Classifying and categorizing the template model view can be helpful for subsequent use by users who are searching for template model views. By way of example, the classification can be based on the style of the home, the number of rooms, the builder, the developer, etc. At step 409, process 400 stores the generated template model view in, for example, template model view database 201 of FIG. 2, such that it can be further used by other users to readily create customized model views.

FIGS. 5A-5D are flowcharts of a process for initiating a home monitor and control interface and for accessing template model views, according to various exemplary embodiment. For the purpose of illustration, process 500 can be performed by home monitor and control platform 105 of FIG. 1. At step 501, home monitor and control platform 105 receives a request from a user using user device 101a. At step 503, process 500 determines whether the received request is for a template model view. If the received request is initiated by a user to access a template model view to create a customized model view, then the model view creation process is performed (as detailed in FIG. 5B).

Otherwise, the process 500 determines that the request from the user is not an access request to a template model view, process 500 determines whether the received request is a request to access to an existing customized model view; if so, the customized model view is retrieved and can be updated or modified (step 507). At step 509, process 500 can transmit the updated customized model view to the user's device. However, if the model view customization process is performed locally within the user device 101a, step 509 can be avoided. The customized model view can thus be used to monitor and control sensors and actuators in the user's premise.

Figure 5A:
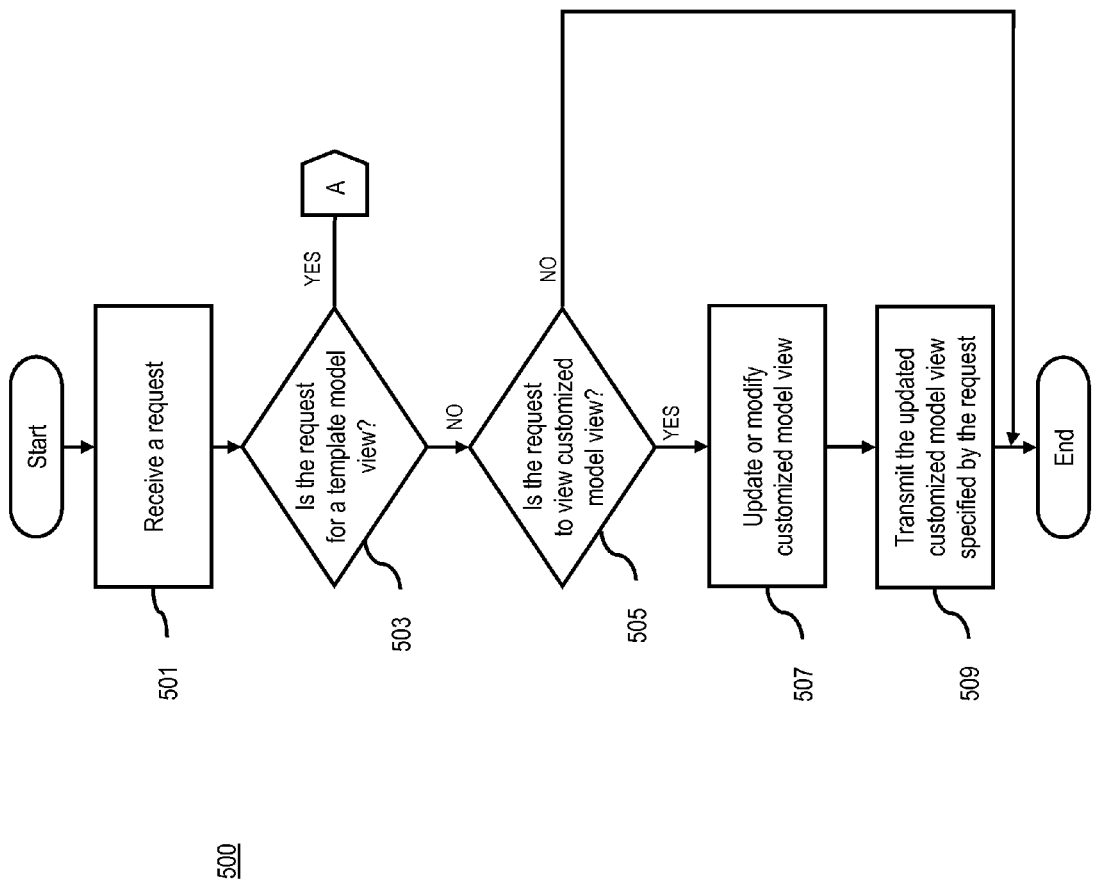
Figure 5B:
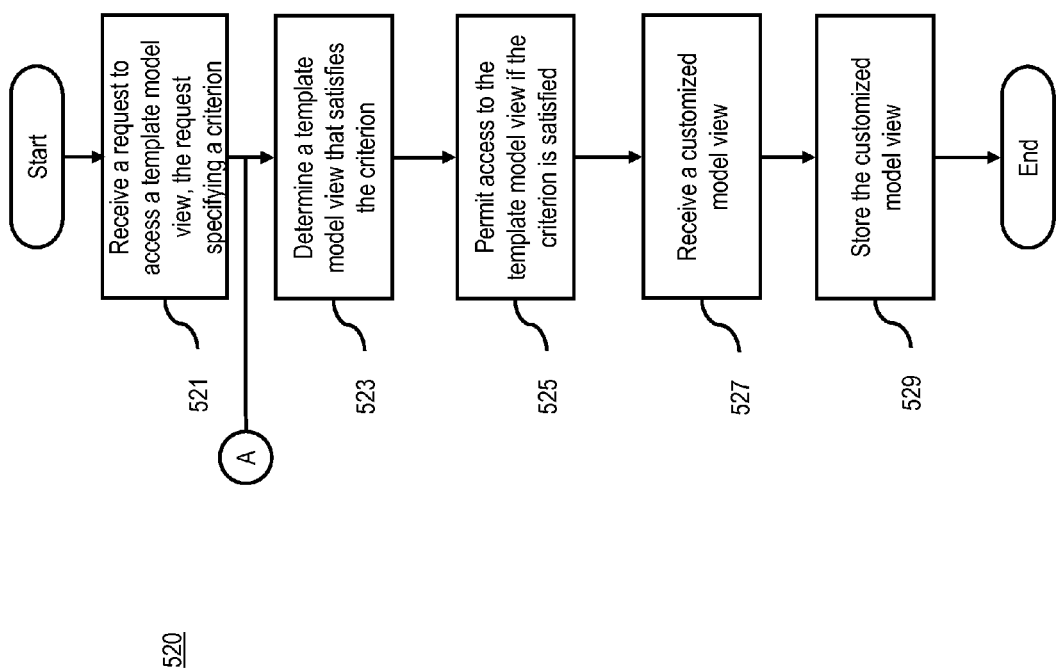

FIG. 5B is a flowchart of a process for permitting access to a template model view, according to one exemplary embodiment. Process 520 can be carried out when a user seeks to access to a template model view for creation of a customized model view for the user's premise. In one exemplary embodiment, process 520 can be performed at home monitor and control platform 105. At step 521, home monitor and control platform 105 receives a request from a user to access a template model view. In one example, the received request can include a criterion for the template model view. This criterion can include information (e.g., style of home, number of rooms, or number of floors (i.e., stories)) regarding the premise of the user requesting the template model view. At step 523, process 520 can determine a template model view that satisfies the criterion. In one exemplary embodiment, search engine 205 of FIG. 2 can search template model view database 201 of FIG. 2 to determine a template model view that satisfies the criterion.

When the template model view satisfying the criterion is determined, process 520 permits access to the template model view at step 525. In one exemplary embodiment, when the user gains access to the template model view, the user will customize the template model view by, for example, adjusting dimensions, adding/removing walls, doors, windows, or other features, adding specific control or monitoring device, etc. At step 527, the user device 101a can receive the customized model view (created from the template model view) from the user. At step 529, the customized model view is stored, for example, at customized model view database 213 of FIG. 2.

Figure 5D:
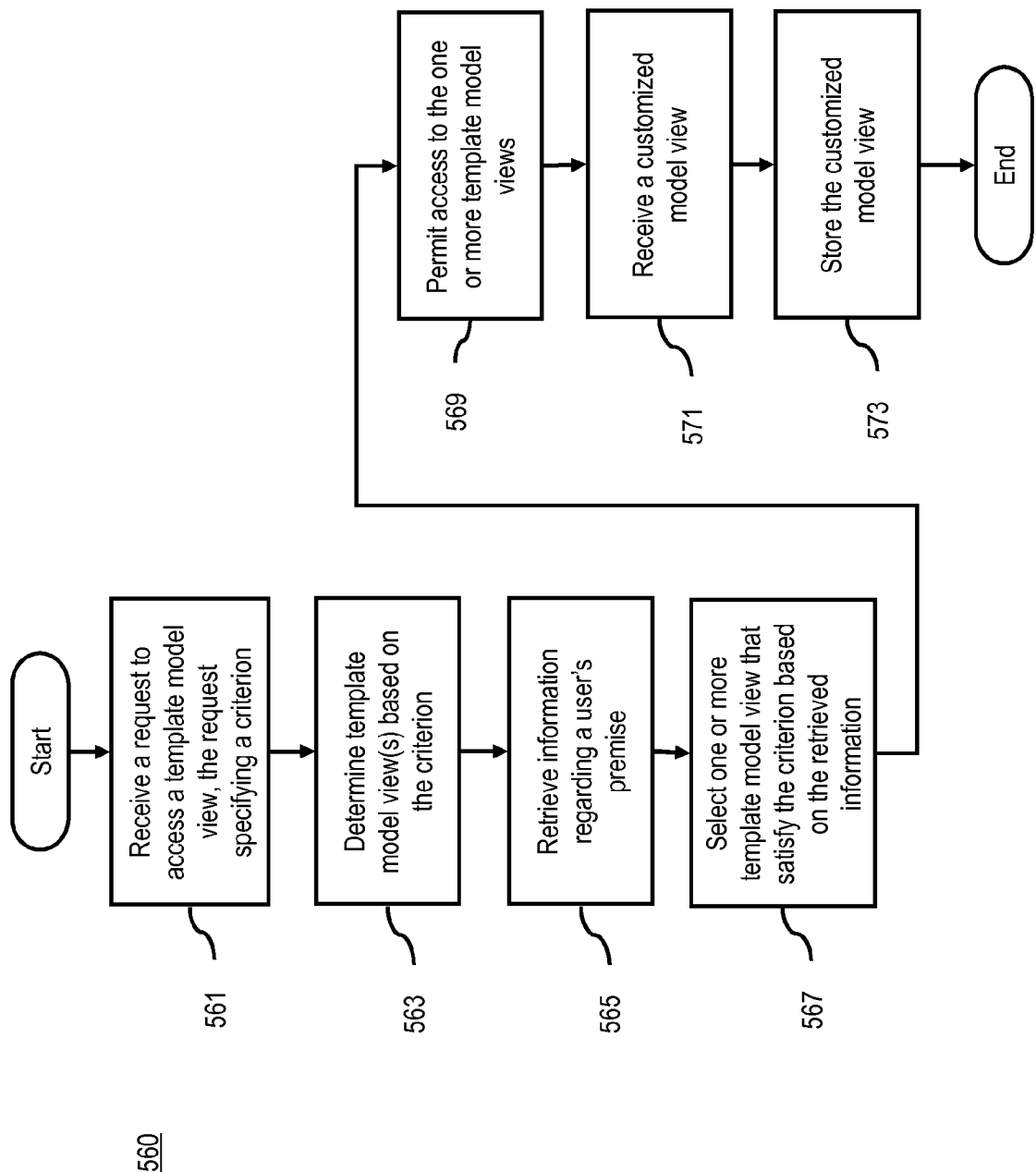

FIGS. 5C and 5D illustrate processes for permitting access to template model views, according to certain embodiments. Process 540 of FIG. 5C can be performed at home monitor and control interface platform 105. At step 541, a request to access a template model view from the user device 101a. The received request can include a criterion for the template model view. At step 543, the platform 105 can prompt the user with one or more questions to determine information about user's premise. At step 545, home monitor and control platform 105 can receive information about the user's premise in response to the one or more questions supplied to the user. At step 547, the process determines an appropriate template model view based on the received criterion and information regarding the user's premise. At step 549, the requesting user is permitted to access the determined template model view. The user can customize the template model view and transmit the customized model view to the platform 105. At step 551, customized model view is received, and at step 553, is stored, for example in customized model view database 213.

In process 560 of FIG. 5D, a request to access a template model view is received such that the request specifies a criterion for the template model view, per step 561. At step 563, one or more template model views are determined based on the received criterion. At step 565, information regarding the user's premise is retrieved. In one exemplary embodiment, platform 105 can retrieve information regarding the user's premise from a mapping services 111. In another example, home monitor and control platform 105 can retrieve information regarding the user's premise from user/residence database 115.

At step 567, the process 560 selects one or more template model views that satisfy the criterion and are based on the retrieved information relating to the user's premise. At step 569, platform 105 can grant access by the user device 101a to the one or more template model views. As noted, the template model view is the customized by the user, and transmitted to the platform 105. It is noted that if the model view creation process is executed on the platform 105, the created model view would not need to be transmitted. Thereafter, at step 571, platform 105 can receive or retrieve the customized model view from the user; and at step 573, the customized model view is stored within the platform 105.

Figure 6:
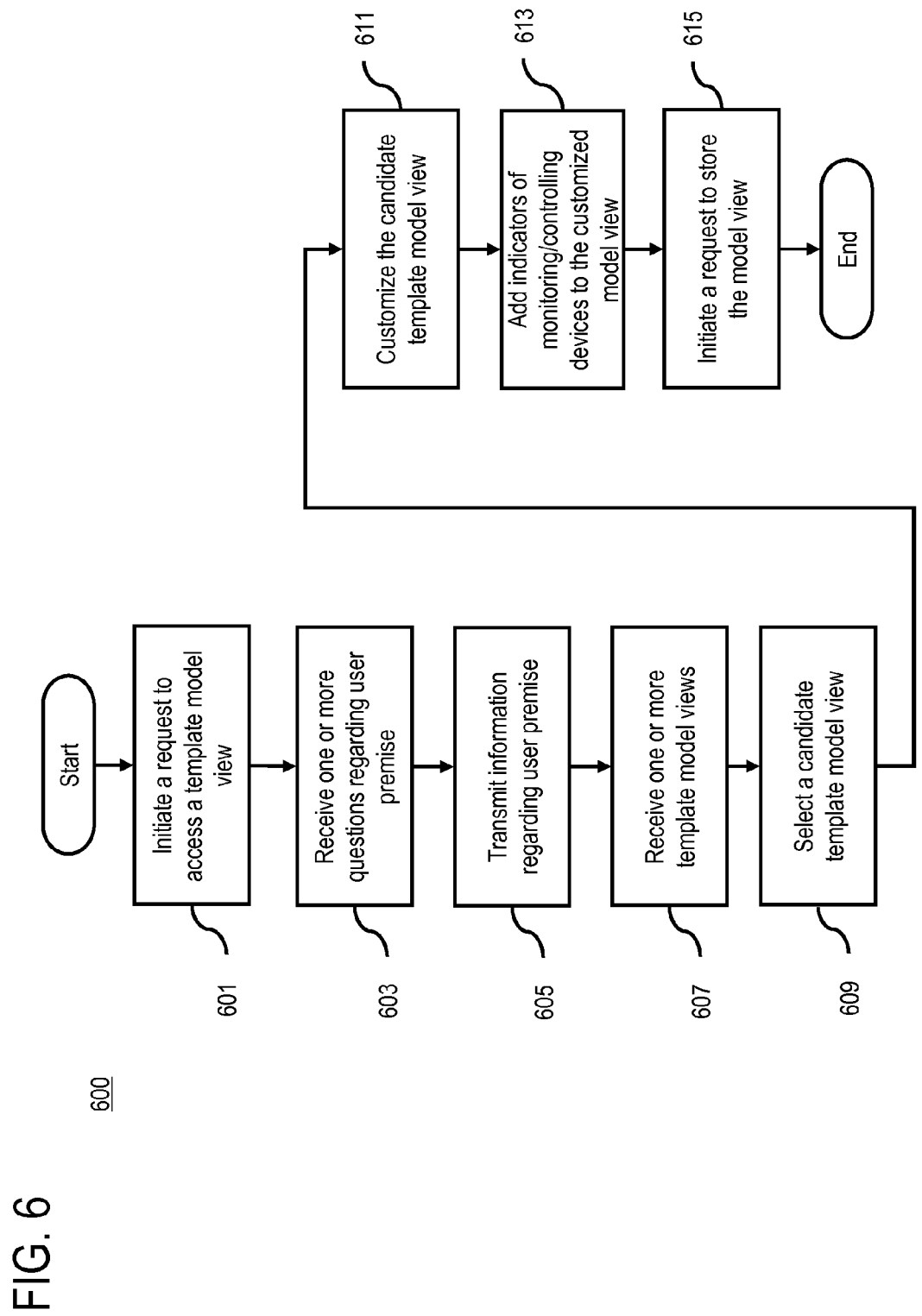
FIG. 6 is a flowchart of a process for creating a customized model view, according to an exemplary embodiment.

FIG. 6 is a flowchart of a process for creating a customized model view, according to one exemplary embodiment. Process 600 can be performed by a model view creation graphical user interface resident on the user device 101a, for instance. The user device 101a communicates with the home monitor and control platform 105 to create a model view reflective of the user's premise.

As discussed before, as a baseline, the user can start with a template model view that resembles the user's premise and build on that template to create a customized model view. Under the scenario of FIG. 6, process 600 starts by initiating a request to access to a template model view, per step 601. At step 603, the user can be prompted by one or more questions regarding the user's premise; these questions can be supplied by the platform 105. Such questioning or prompting can be in form of a "wizard tool." At step 605, requested information regarding the user's premise can be transmitted, for example, to home monitor and control platform 105.

This information can be used to determine one or more template model views for the user's premise. At step 607, the template model views are then transmitted by the platform 105 and received by the user device 101a. At step 609, a candidate template model view is selected among multiple template model views by the user. At step 611, the selected template model view can be customized, for example, by adjusting dimension, adding/removing walls, windows, or other feature, etc. At step 613, specified indicators for monitoring and/or controlling device can be added to the customized model view. At step 615, a request is initiated to store the customized model view. In another embodiment, the customized model view can be stored in the user device 101a. Alternatively or additionally, the customized model view can be stored in customized model view database 213 of FIG. 2.

The described processes, according to certain embodiments, advantageously enable users to conveniently and expediently develop highly customized interfaces for monitoring and control of their home. The customization permits a greater accuracy in determining the state of sensors and actuators throughout the premises.

Figure 7:
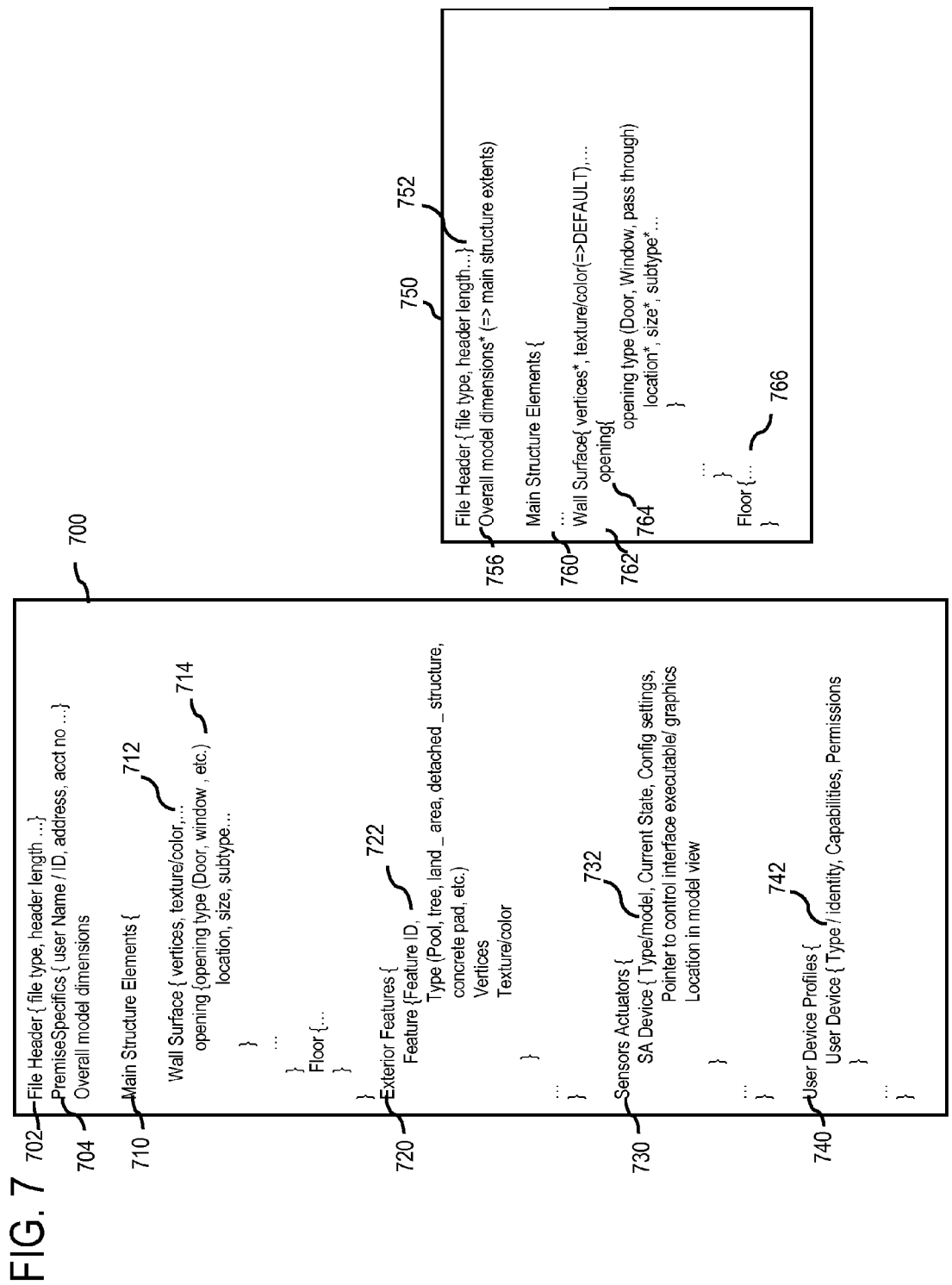
FIG. 7 shows an example of a file structure or data structure for representing a customized model view, according to one embodiment.

FIG. 7 shows an example of a file structure or data structure for representing a customized model view, according to one embodiment. In particular, FIG. 7 shows the comparison between a model view including specific information for a particular user premise and version of the model with all identifying information removed to render it suitable for use as a template by other users. A file of this type may be used to reconstruct a representation of the premise as well as the location of sensors and actuators. This example file also includes data about control devices that the user may use in the context of monitoring and controlling the premise. The processing of block 403 and the action of the anonymizer module 217 shown in previous drawings accomplish the conversion of customized model view file 700 into a corresponding generic or template model file 750. Software programs such as AutoCAD™ by Autodesk, Inc. or Google SketchUp represent technology for providing an interface for constructing a model view. Tools such as these can be readily adapted for use in the system of FIG. 1 to generate a descriptive file comparable to customized model view file 700.

In a computing system (e.g., system of FIG. 8), file 700 may be read from a data storage device into memory to populate a similarly organized data structure in memory to be accessible for processing by a computer, microprocessor or the like. In this example, customized model view file 700 begins with a file header 702; the first few bytes of which may identify the file as being a customized model view file for use in the context of the system shown in FIG. 1. The file header 702 may also describe other general attributes about the file such as the length, in bytes, of the header portion to facilitate rapid parsing to reach other major portions of the file. The data-containing portions of the file include a 'Premise Specifics' section 704, an 'Overall Model Dimensions' section 706, a 'Main Structure Elements' section 710, an 'Exterior Features' section 720, a 'Sensors and Actuators' section 730 and a 'User Device Profiles' section 740. Any of these sections can include additional information for practical purposes, such as a byte count offset to reach the next major section in the file.

The Premise Specifics section 704 includes information to identify the user or the premise location to which the customized model view described by the file pertains. The Overall Model Dimensions section 706 describes the extents of the overall model described by the other portions of the file, in essence establishing the bounds at the outset to facilitate scaling of other dimensions found in the more detailed portions of the file. Other parameters generally applicable to the overall model description, such as units of measurement, number of model layers or whether the model is 3D or strictly 2D, may also be expressed in this section.

Next, the 'Main Structure Elements' section 710 provides the principal description of the user's premise itself, such as the placement of walls and openings such as doors and windows. By way of example in FIG. 7, elements are shown for one wall surface and one floor surface, though a typical description of a building will have many more walls and other elements. A wall descriptor 712 is shown as including such information as a list of vertices, such as expressed in X, Y, Z coordinates for each vertex, as well as texture, color or other descriptors of visual appearance. Furthermore, wall descriptor 712 may have one or more associated sub-elements, described by an opening descriptor element 714, which may be used to describe openings such as doors and windows set within the wall. Element 714 provides for indicating the type of opening, the location of the opening on the wall, the size of the opening, and the subtype, such as single door, double door, sliding door or, if a window, the particular type of window. It is contemplated that a variety of other descriptors may be employed and arranged in a variety of ways to describe the structure depending on the types of premises and associated monitoring and control services. In this example, other portions of the main structure are described by such elements as floor descriptor 716 and similar descriptors for stairs, ceilings, roofs, columns, overhangs and the like.

In contrast to the Main Structure Elements section 710, the 'Exterior Features' section 720 is intended to cover the surroundings of the main structure such as landscaping, trees, swimming pools, outbuildings, sidewalks or driveways, concrete pads, etc. These are potentially relevant to home monitoring and control, for example, in relation to exterior lighting, control of swimming pool temperature, sprinkler systems and placement of intrusion sensors or fire control boxes. In accordance with described processes, the elements of the Exterior Features section are segregated from the Main Structure Elements section because the exterior features tend to be unique to a given property and because the exterior features provide identifiable attributes without really contributing to the value of a template for possible use by others in describing their own properties.

The Exterior Features section 720 of customized model descriptor file 700 may comprise a list of feature descriptor structures, such as feature descriptor 722. This feature descriptor may include a unique identifier for the feature described and an indicator of the type of feature. The shape, size or coverage of the particular feature may be described by sets of vertices or other parameters related to spatial coordinates or orientation. Feature descriptor 722 may also described texture or color information related to how the feature will be rendered in any interface presented to the end user.

The Sensors and Actuators section 730 comprises a list of one or more descriptor elements 732, each pertaining to a particular sensor or controllable device. An example descriptor element, labeled "SADevice", is shown to comprise data pertaining to a particular device such as the type, brand, or model of the device, its configuration settings and, optionally, its current status. Another parameter that may be represented in descriptor 732 relates to the location of the device within the model view, and may be expressed in the same units and coordinate system used to describe the main structure.

Additionally, descriptor 732 may identify or point to executable code associated with the particular device and compatible with the execution environment of the platform 105, the home monitoring and control unit 109 or one of the user devices 101a-n. For example, as a user works with the home control interface and wants to interact with a controllable device, such as a room temperature setting, an executable file or program provided by the manufacturer of the device may be invoked to present a pop-up dialog within the user interface on the user's display showing the current setting of the control, and providing for user input to effect the settings of the control. The program can also provide a particular graphical appearance and arrangement of controls to be consistent with the manufacturers branding and desired look and feel. Additionally, or alternatively, descriptor element 732 may contain or point to graphics elements for depicting the status of the control and depicting the appearance of the control itself as it appears in the rendered view of the main structure presented to the user. The graphic element may also be one that is added to a palette of controls from which the user can select and place controls as they create a customized model view for their particular premise.

Moreover, shown within customized model view file 700 is a 'User Device Profiles' section 740. This section may comprise one or more user device descriptor elements 742; each of the elements 742 describes a device, such as user device 101a or 101n, that the user may use to interface with the home monitor and control unit 109 or the platform 105. Also, each user device descriptor element 742 can include, for example, the type, model, or manufacturer for the device as well as a unique identifier, such as a serial number, URL or MAC address, for the device. Furthermore, it is contemplated that descriptor element 742 can list the capabilities of the device such as display resolution, support for audio output. Each descriptor element 742 may also specify, for a given device, the permissions for the particular device. In other words, 'permissions' relates to what degree of control the device may exercise over all of the sensors and actuators associated with the premise listed in section 730, as well as permissions to interact with, for example, the home monitoring control platform 105 to update user settings and make changes to the customized model view. This section may also describe user preferences, such as preferred views and vantage points for rendering a view of the model on the display of a user device.

As described earlier, customized model view file 700 may be created by a user and stored in database 213, yet to adapt this form of the file for use as a template for use by other users requires removing information that identifies the user or premise or otherwise potentially compromises the security and privacy of the end user. Consequently, specific portions of file 700 need to be removed or changed in order to render a template-suitable form of the type shown in template file 750 in FIG. 7. As depicted in FIG. 7, an asterisk or other notation is used to highlight values that may change within template file 750.

Template file 750 is shown to comprise a file header 752, which is similar to file header 702. However, with header 702, the file type may be changed to reflect the fact that the data within the file pertains to a template rather than to a customized model view. It is noted that other parameters related to the overall length of the file or pointers into major sections within the file may also change. Template file 750 is also shown to carry forth an Overall Model Dimensions section 756. This data may be changed to reflect the dimensional expanse of just the main structure rather than the expanse of the entire model (Overall Model Dimensions 706) that may have been presented in the customized model view file 700. As for the Main Structure Elements section 760, this resembles that of the customized model view file 700, but with some changes to obscure details that would facilitate identifying specific structures. For example a wall surface descriptor 762 may well carry forth an analogous description from customized model view file 700, but with some slight changes in dimensions or the locations of vertices describing the wall. Some parts of the structure may change in size or aspect ratio while still assuring, for example, that wall edges meet other wall edges in compliance with the original model. Furthermore, any particular color or texture (brick, siding, stucco) associated with the wall surface is overwritten with a default value so that those attributes cannot be used to uniquely identify a particular residence, for example. Within individual opening descriptors 764, other changes may be made to the number, location, size or type of the openings to further obscure any particular information that would lend to identifying specific premises. A similar set of operations may apply to other descriptor elements such as Floor descriptor element 766 or potential other descriptors of the main structure.

Of particular note in comparing customized model view file 700 to a template-ready file 750 is the absence of sections related to exterior features, sensors and actuators and user device profiles, according to certain embodiments. Exterior features are excluded from the template because they are less likely to have any value to other users and provide a great deal of readily observable identifying information pertaining to a particular premise. All of the data pertaining to particular sensors and actuators is also removed because the locations and selection of these is likely to be different in every single premise and because such information potentially compromises security of the particular residence. User device profiles are also removed for a similar set of reasons. Thus, the role of anonymizer module 217 is to convert customized model view file 700 into a template file 750 by removing the major sections as just described and optionally making appropriate changes in the descriptors for the main structure elements to obscure some identifying details.

It is contemplated that another file section, not shown, might describe furnishings within the main structure and that this entire section would also be omitted as a customized model view is converted into a generic template. Where furnishing descriptions are inserted within the main structure description, such as in a room-by-room organization of the description as may facilitate the rendering of views, these particular furnishing descriptors would be removed from the main structure section in the course of deriving a template file.

As the user interacts with a user interface to create the customized model view, the resulting output file enforces a segregation of identifiable information from reusable template information. As a useful advantage, this approach relieves the end user of making the determination of what constitutes template data versus identifiable information and reduces the chances that an action or inaction of an end user will inadvertently expose identifying information to other users.

The processes described herein for template model view generation for home monitor and control interface may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
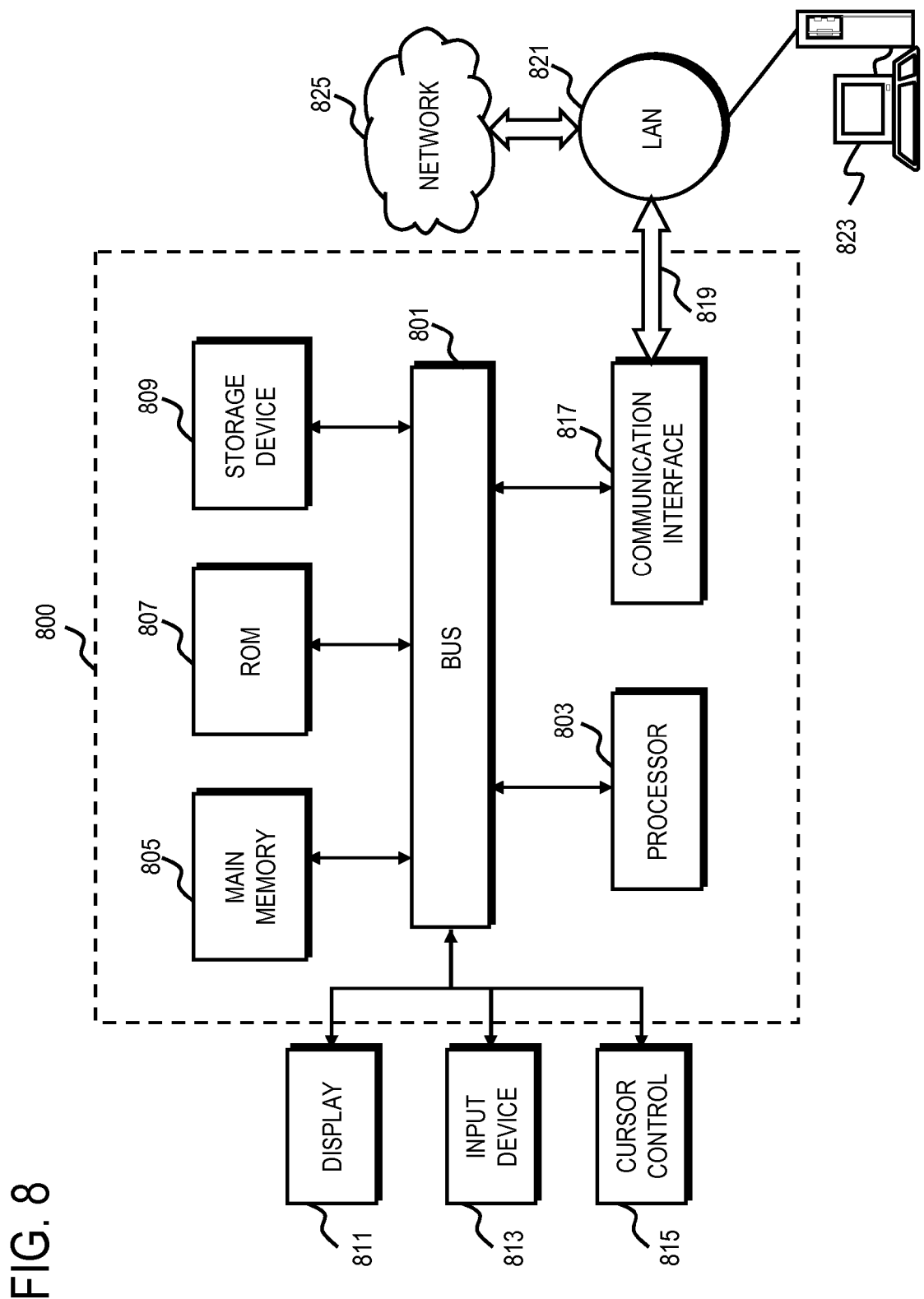
FIG. 8 is a diagram of a computer system that can be used to implement various exemplary embodiments.

FIG. 8 illustrates computing hardware (e.g., computer system) upon which an embodiment according to the invention can be implemented. The computer system 800 includes a bus 801 or other communication mechanism for communicating information and a processor 803 coupled to the bus 801 for processing information. The computer system 800 also includes main memory 805, such as random access memory (RAM) or other dynamic storage device, coupled to the bus 801 for storing information and instructions to be executed by the processor 803. Main memory 805 also can be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
  receiving a model view specified by a user via a user device, wherein the model view includes a floor plan of a premise corresponding to the user, and the model view further includes location information of one or more sensors or one or more actuators that have been identified by the user as being within the floor plan of the premises corresponding to the user;
  generating, via a processor, a template model view based on the received model view by removing, via the processor, identifying information associated with the user
  storing the template model view in a memory for access by another user, wherein the template model view is used by the other user to identify location information of one or more sensors or one or more actuators within the floor plan that corresponds to a premises of the other user;
  comparing the template model view with stored template model views; and
  classifying the template model view based on the comparison,
  wherein removing identifying information associated with the user includes removing the location information of the one or more sensors or one or the more actuators that have been identified by the user as being within the floor plan of the premises corresponding to the user.

2. A method of claim 1, further comprising:
  receiving a request from the other user to access the template model view, the request specifying a criterion;
  determining that the template model view satisfies the criterion; and
  permitting access to the template model view in response to the request, if the criterion is satisfied.

3. A method of claim 2, wherein the criterion is an image of another premise of the other user.

4. A method of claim 2, further comprising:
  prompting the other user with one or more questions to determine information about the other premise, wherein the permission to access the template model view is further based on the determined information.

5. A method of claim 2, further comprising:
  determining a plurality of template model views that satisfy the criterion;
  retrieving information about another premise based on the request; and
  selecting one or more of the template models using the retrieved information.

6. A method of claim 5, wherein the information includes at least one of geographical location, architectural description, and information associated with a developer of the other premise.

7. A method of claim 6, wherein the architectural description includes information relating to at least one of style, elevation, number of stories, number of bedrooms, and number of bathrooms.

8. A method of claim 1, wherein the template model view is stored in a database managed by a service provider, the method further comprising:
  initiating transmission of the template model view for customization and use by a user device configured to present a graphical user interface for controlling and displaying the sensors or the actuators within the customized model view as part of a home monitoring service provided by the service provider.

9. An apparatus comprising:
  a processor configured:
  to receive a model view specified by a user, wherein the model view includes a floor plan of a premise that corresponds to the user, and the model view further includes location information of one or more sensors or one or more actuators that have been identified by the user as being within the floor plan of the premises corresponding to the user,
  to generate a template model view based on the received model view by removing identifying information associated with the user,
  to store the template model view for access by another user, wherein the template model view is used by the other user to identify location information of one or more sensors or one or more actuators within the floor plan that corresponds to a premises of the other user,
  to compare the template model view with stored templates, and
  to classify the template model view based on the comparison,
  wherein removing identifying information associated with the user includes removing the location information of the one or more sensors or one or the more actuators that have been identified by the user as being within the floor plan of the premises corresponding to the user.

10. An apparatus of claim 9, wherein the processor is further configured to receive a request from the other user to access the template model view, the request specifying a criterion, to determine that the template model view satisfies the criterion, and to permit access to the template model view in response to the request, if the criterion is satisfied.

11. An apparatus of claim 10, wherein the criterion is an image of another premise of the other user.

12. An apparatus of claim 10, wherein the processor is further configured to prompt the other user with one or more questions to determine information about the other premise, wherein the permission to access the template model view is further based on the determined information.

13. An apparatus of claim 10, wherein the processor is further configured to determine a plurality of template model views that satisfy the criterion, to retrieve information about another premise based on the request, and to select one or more of the template models using the retrieved information.

14. An apparatus of claim 13, wherein the information includes at least one of geographical location, architectural description, and information associated with a developer of the other premise.

15. An apparatus of claim 14, wherein the architectural description includes information relating to at least one of style, elevation, number of stories, number of bedrooms, and number of bathrooms.

16. An apparatus of claim 9, wherein the template model view is stored in a database managed by a service provider, the processor is further configured to initiate transmission of the template model view for customization and use by a user device configured to present a graphical user interface for controlling and displaying the sensors or the actuators within the customized model view as part of a home monitoring service provided by the service provider.

17. A non-transitory computer-readable storage medium carrying one or more sequences of one or more instructions which, when executed by one or more processors, cause an apparatus to at least perform the following steps:
   receiving a model view specified by a user, wherein the model view includes a floor plan of a premise corresponding to the user, and the model view further includes location information of one or more sensors or one or more actuators that have been identified by the user as being within the floor plan of the premises corresponding to the user;
   generating a template model view based on the received model view by removing identifying information associated with the user;
   storing the template model view in a database for access by another user, wherein the template model view is used by the other user to identify location information of one or more sensors or one or more actuators within the floor plan that corresponds to a premises of the other user;
   comparing the template model view with stored template model views; and
   classifying the template model view based on the comparison,
   wherein removing identifying information associated with the user includes removing the location information of the one or more sensors or one or the more actuators that have been identified by the user as being within the floor plan of the premises corresponding to the user.

18. A non-transitory computer-readable storage medium according to claim 17, further comprising the step:
   selecting one of the template model views stored in the database in response to a request by the other user,
   wherein the selected model view provides a baseline model view for customization by the other user.

* * * * *